(12) United States Patent
Horton et al.

(10) Patent No.: US 6,629,703 B2
(45) Date of Patent: Oct. 7, 2003

(54) OPENING DEVICE FOR A COLD GAS INFLATOR

(75) Inventors: Mark Horton, Lakeland, FL (US); Kimberly Ritter, Highland City, FL (US); William Francis McLeod, II, Riverview, FL (US); Michael Eugene Kelley, Valrico, FL (US); Michael K. Dennis, Lakeland, FL (US); Richard Mead Townsend, Valrico, FL (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/017,022

(22) Filed: Dec. 14, 2001

(65) Prior Publication Data

US 2003/0111831 A1 Jun. 19, 2003

(51) Int. Cl.[7] .............................................. B60R 21/26
(52) U.S. Cl. .................................. 280/737; 137/68.13
(58) Field of Search ............................... 280/737, 736, 280/741; 137/68.13

(56) References Cited

U.S. PATENT DOCUMENTS

| | | | |
|---|---|---|---|
| 3,567,245 A | 3/1971 | Ekstrom | |
| 3,731,948 A | 5/1973 | Risko | |
| 3,777,772 A | 12/1973 | Arnold et al. | |
| 3,834,729 A | 9/1974 | Oka et al. | |
| 3,854,491 A | 12/1974 | Bryan et al. | |
| 3,961,806 A | 6/1976 | Katter | |
| 5,022,674 A | 6/1991 | Frantom et al. | 280/741 |
| 5,076,312 A | 12/1991 | Powell | |
| 5,388,322 A | 2/1995 | Simon | 29/525 |
| 5,531,473 A | 7/1996 | Rink et al. | 280/737 |
| 5,536,040 A * | 7/1996 | Cuevas et al. | 280/737 |
| 5,542,702 A | 8/1996 | Green et al. | 280/737 |
| 5,586,783 A * | 12/1996 | Adam et al. | 280/737 |
| 5,609,362 A | 3/1997 | Sparks et al. | 280/741 |
| 5,720,495 A | 2/1998 | Faigle et al. | 280/737 |
| 5,803,493 A * | 9/1998 | Paxton et al. | 280/737 |
| 5,826,904 A | 10/1998 | Ellis et al. | 280/737 |
| 5,879,025 A | 3/1999 | Blumenthal | 280/741 |
| 5,893,583 A | 4/1999 | Blumenthal et al. | 280/737 |
| 6,131,948 A | 10/2000 | Cuevas | 280/737 |
| 6,152,484 A | 11/2000 | Fischer | 280/736 |
| 6,206,414 B1 * | 3/2001 | Cook et al. | 280/737 |
| 6,217,065 B1 | 4/2001 | Al-Amin et al. | 280/737 |
| 6,221,186 B1 | 4/2001 | Rink et al. | 149/1 |
| 6,247,725 B1 | 6/2001 | Moller | 280/737 |
| 6,273,462 B1 | 8/2001 | Faigle et al. | 280/737 |
| 6,328,336 B1 | 12/2001 | Takahashi et al. | 280/737 |
| 6,412,811 B1 | 7/2002 | Campbell | 280/730.2 |
| 6,554,315 B2 * | 4/2003 | Freesmeier | 280/737 |

FOREIGN PATENT DOCUMENTS

| | | |
|---|---|---|
| DE | 4410574 | 10/1994 |
| DE | 10038676 | 4/2001 |
| WO | 0142047 A2 | 6/2001 |

* cited by examiner

*Primary Examiner*—Peter C. English
(74) *Attorney, Agent, or Firm*—Jarett Rieger

(57) ABSTRACT

A cold gas inflator having an opening device for rupturing a burst disk. The cold gas inflator is filled with stored gas. The cold gas inflator has a burst disk, which prevents the stored gas from exiting the pressure vessel. In the event of a automobile accident, the opening device is actuated, which causes the ignition of pyrotechnic material. This ignition generates a shockwave of sufficient energy to rupture the burst disk. The stored gas flows into the diffuser and then exits the cold gas inflator in the radial direction. In another embodiment, the stored gas exits the cold gas inflator in the axial direction.

9 Claims, 3 Drawing Sheets

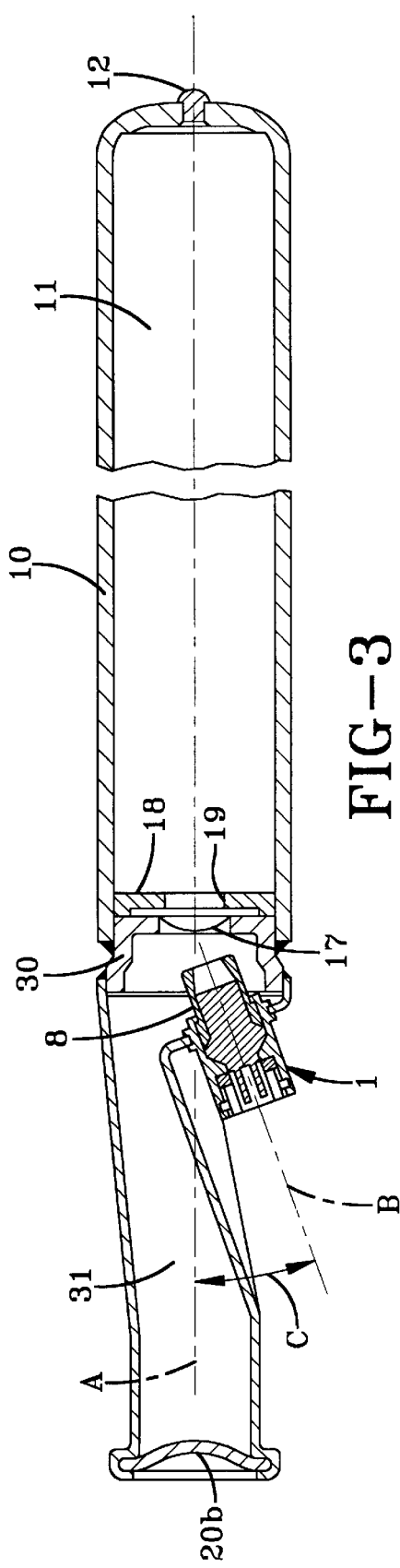
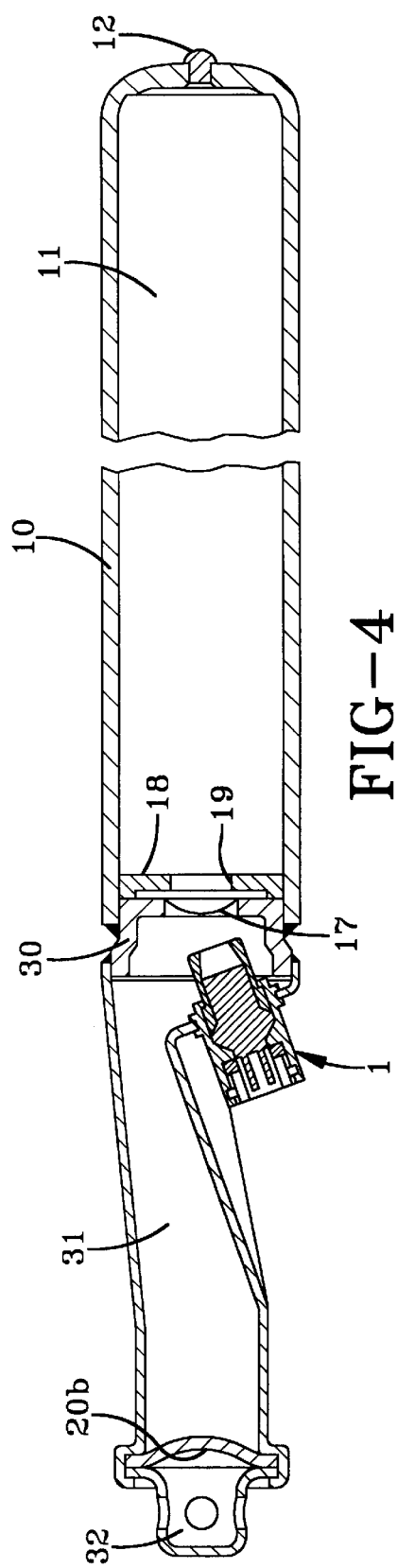

OPENING DEVICE FOR A COLD GAS INFLATOR

FIELD OF THE INVENTION

The present invention relates generally to safety devices to protect occupants of moving vehicles. More particularly, the present invention relates to an opening device for a cold gas inflator.

BACKGROUND OF THE INVENTION

It is well known in various technologies to require the rapid release of pressurized fluid from a pressure vessel. Examples of such technologies include vehicle occupant inflatable restraints, fire suppression systems, and emergency air containers.

In the field of vehicle occupant inflatable restraints, the cold gas inflator inflates a vehicle airbag by releasing stored gas. The stored gas generally comprises one or more inert gases such as argon or helium, and in the event of an automobile crash, the stored gas exits the cold gas inflator and flows into an airbag, which causes the airbag to inflate. Since cold gas inflators release stored gas, these inflators do not have the problems typically associated with other types of inflators such as toxic gas and hot inflation gas.

Cold gas inflators are suitable for use in inflating curtain, thorax, and head and thorax airbags. Curtain airbags are mounted in the roof of a vehicle and when inflated, protect the occupant's head. Thorax airbags are mounted lower than curtain airbags and are generally mounted in vehicle seats.

Cold gas inflators are equipped with a discharge opening, and the stored gas must travel through this passageway to exit the pressure vessel. Typically, the discharge opening has a blocking member, which prevents the stored gas from passing through the discharge opening and escaping the pressure vessel. During an automobile crash, an opening device must quickly remove the blocking to allow the airbag to be rapidly deployed. It is paramount that the opening device be reliable so that the actuation of an opening device always yields an unblocked discharge opening. Along with being reliable, it is desirable for the opening device to be made from as few parts as possible. An example of an opening device operates by removing a support for a sealing element. Once the sealing element loses its support, the sealing element ceases to block the discharge opening and the stored gas is able to flow through the discharge opening. This type of opening device is known from U.S. Pat. No. 6,247,725 B1. Another type of opening device works by generating a shock wave. The inflator in WO 01/42047 A2 uses a shock wave to open a burst disc, which causes the stored gas to escape from the gas vessel. The inflator in U.S. Pat. No. 5,022,674 also uses a shock wave to break the disk permitting inflation gas to exit the pressure vessel.

SUMMARY OF THE INVENTION

In the present invention, the cold gas inflator includes an opening device for unblocking the discharge opening. The discharge opening is blocked with a burst disk, and the burst disk has a dome-shape configuration when the pressure vessel is filled with stored gas. The opening device for the present invention is an igniter with an ignition material and a nozzle, which both retains the igniter to the igniter endcap and also focuses the output energy of the igniter greatly increasing the reliable opening of the burst disc. Actuation of the igniter results in the generation of a shock wave, which has enough energy to fully rupture the burst disk. Once the burst disk has been ruptured, the stored gas is not obstructed by the burst disk and is able to leave the inflator by flowing through the discharge opening.

According to one aspect of the invention, the cold gas inflator is provided with an orifice plate to restrict the flow of stored gas through the discharge opening.

Another aspect of the invention includes an axial flow diffuser to direct the stored gas out of the cold gas inflator in an axial direction as oppose to a radial direction. In this embodiment, the gas flows away from the inflator along the longitudinal axis of the inflator. In this embodiment, the acute angle formed between the longitudinal axis of the opening device and the longitudinal axis of the pressure vessel is greater than 10°. In a further aspect of the invention, the cold gas inflator has axial flow elbow to direct the stored gas out of the inflator in an axial direction. With the axial flow elbow, the stored gas does not flow along the longitudinal axis of the pressure vessel.

BRIEF DESCRIPTION OF THE DRAWINGS

Additional features of the invention result from the additional claims, description, and drawing, in which the exemplary embodiments of the invention are described in detail in the following:

FIG. 3 is a partial cross sectional schematic diagram of a cold gas inflator with an axial flow diffuser.

FIG. 4 is similar to FIG. 3 except that the cold gas inflator has a flow diverter.

DETAILED DESCRIPTION OF THE INVENTION

Figure 1:
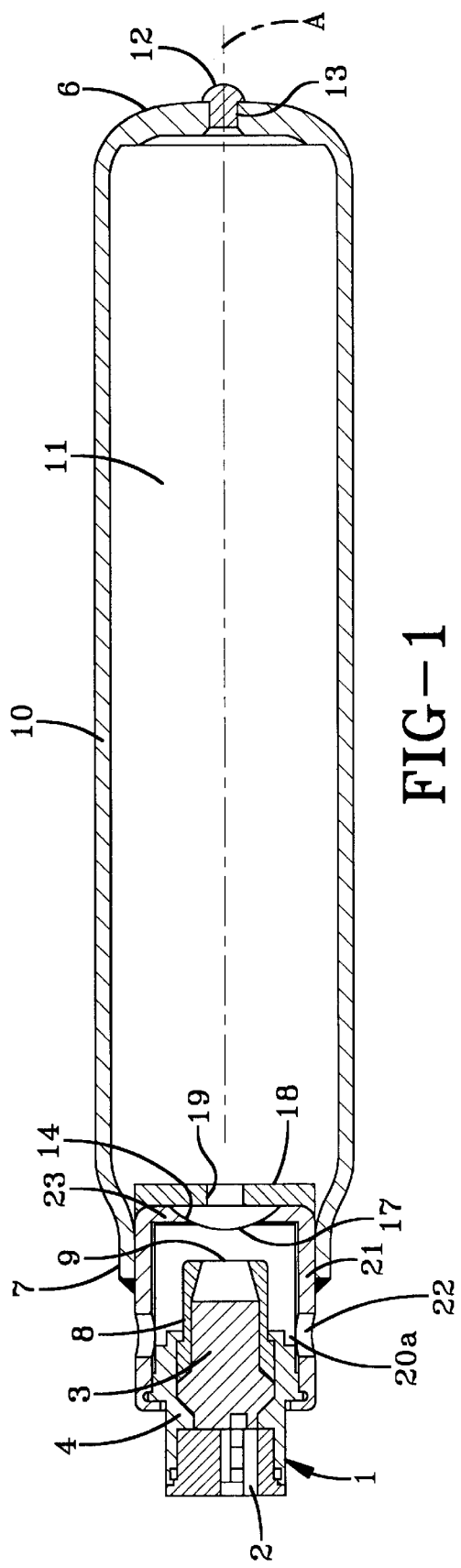
FIG. 1 is a partial cross sectional schematic diagram of a cold gas inflator with a radial flow diffuser.

FIG. 1 shows an exemplary cold gas inflator for use in an automotive safety restraint system. The cold gas inflator has a pressure vessel 10 filled with stored gas 11, which is released from the inflator during an automobile crash to inflate a vehicle airbag. The pressure vessel 10 has a generally cylindrical shape; it is understood that a pressure vessel having a spherical shape may also be used in the practice of the present invention. The pressure vessel 10 has a circular cross section. The pressure vessel 10 may be formed of stainless steel, low carbon steel, or any other suitable material, which has sufficient strength and extremely low permeability to the gas.

The ideal characteristics for the stored gas 11 are that the gas is inert, is not highly temperature sensitive, and has a high inflation speed. According to the present invention, the storage pressure of the inert gas is between 41,370 kPa and 46,540 kPa. It is possible to design a cold gas inflator that operates properly under a pressure between 3447 kPa and 82740 kPa using either an inert or diatomic gas.

The stored gas can include one or more gases, which include argon, neon, xenon, helium and nitrogen. Preferably, the stored gas consists of a mixture of argon and helium. The preferred gas percentages for an argon/helium system include a gas mixture having from 5–100% helium with the remaining amount being argon. The sum of the gas percentages for helium and argon equals 100%.

The pressure vessel 10 is filled with stored gas 11 through the gas fill port 13 in the first end 6 of the pressure vessel. The gas fill port is sealed by a plug 12 made from carbon steel to prevent gas from escaping after the pressure vessel 11 has been filled to the desired pressure. It is preferred that the plug is secured to the gas fill port 13 by a resistance weld, but one skilled in the art realizes that other types of welding could be utilized to fuse the plug 12 to the pressure vessel 10.

The gas fill port 13 is located on a first end 6 of the pressure vessel 10, and an opening device 1 for unblocking the discharge opening 14 by rupturing a burst disk 17 is located on a second end 7. With reference to FIG. 1, the opening device is attached to a diffuser 21, which is attached to the pressure vessel 10. The diffuser may be formed of stainless steel, low carbon steel, or any other suitable material having sufficient structural strength. The generally cylindrical diffuser can be telescopically inserted into the generally cylindrical vessel. The diffuser 21 is connected to the cylindrical vessel by a circumferential weld, preferably a TIG weld, but other suitable welding techniques can be employed. One skilled in the art realizes that telescopic insertion of the diffuser to the pressure vessel may not be desired for other types of welding, specifically friction welding, where a butt joint is the preferred geometry.

When the burst disk 17 is attached to the diffuser 21, it has a flat shape, but the burst disk flexes towards the opening device 1 when the pressure vessel 10 is filled. The stored gas 11 applies uniform pressure against the burst disk resulting in its dome shape configuration. In order to decrease the filling time for the pressure vessel, the diffuser legs 23 are able to bend during the filling of the pressure vessel 10 thus distributing the load to the burst disc preventing pre-mature rupture of the burst disc 17 during filling. After filling of the pressure vessel 10, the legs 23 do not return to their original shape. Preferably, the legs 23 bend approximately 4 degrees. It is recognized by those skilled in the art that a rigid diffuser may also be used in conjunction with a hydro-forming process which bulges the disc in the direction of the opening device to amount greater than seen during gas fill. In doing so the gas fill rate may be increased without risk of prematurely failing the burst disc.

A burst disk 17 seals the discharge opening 14 and prevents the stored gas 11 from escaping the pressure vessel 10 after it is filled with gas. For the present invention, the burst disk must meet the following constraints. The burst disk must survive 1.1 times production fill rate or greater. The burst disk must meet USCAR 4500 pressure cycles with no helium leak. The burst disk must open reliably at −40° C. Lastly, the burst disk must hydro-burst at a minimum pressure of 1.25 times the proof pressure and a maximum of 0.8 times the minimum pressure vessel hydro-burst pressure. According to the present invention, the burst disk may be made from stainless steel, nickel-chromium alloys such as INCONEL, nickel-copper alloys such as MONEL or any other suitable material that meets the aforementioned constraints. The hardness of the burst disk should be between "half hard" and "full hard" to minimize burst disk thickness. Hardness is the degree to which a metal will resist cutting, abrasion, penetration, bending and stretching. The indicated hardness of metals will differ somewhat with the specific apparatus and technique of measuring. The preferred thickness for the burst disk is 0.203 mm for 41,370 kPa ambient fills and 0.254 mm for 46,540 kPa ambient fills. The burst disk is attached to the diffuser by a YAG Laser but could be attached by other welding techniques.

The opening device 1 comprises an electrically actuated igniter 3, an end cap 4, and optionally an igniter nozzle 8. The opening device 1 is positioned so that the longitudinal axis of the opening device is essentially parallel with a longitudinal axis of the pressure vessel 10. The igniter 3 communicates with a central processing unit (not shown), which in turn communicates with a sensor means (not shown). The sensor means can be of any type presently used in the art to sense a collision or sudden deceleration of a vehicle. The electric firing pins 2 are insulated from one another and connected by a bridge wire. (not shown). The bridge wire is preferably embedded in one or more layers of pyrotechnic compositions designed to generate a shockwave to rupture the burst disk 17. An example of a suitable pyrotechnic composition or ignition material for the present invention is zirconium potassium perchlorate or ZPP, however, one skilled in the art realizes that other ignition material could be used in the present invention. Examples of igniter suppliers include SDI and EMS-Patvag. The preferred embodiment for the present invention has a bridge wire igniter, but a semiconductor bridge igniter or a smart igniter can also be used.

An end cap 4 houses the igniter 3. The igniter can be connected to the end cap 4 by crimping, welding, screwing, or other suitable attachment means. The end cap 4 is attached to the diffuser 21 by crimping but one skilled in the art appreciates that other methods of attachment are suitable without departing from the scope of the present invention.

The opening device 1 may also comprise an igniter nozzle 8 for directing an output energy from the ignition of the ignition material towards the burst disk 17. As shown in FIG. 1, the nozzle is tapered inward in the direction of the burst disk 17. Without the igniter nozzle 8, the igniter would still rupture the burst disk 17 but will need to be loaded with extra ignition material. It is also possible to utilize an igniter with reinforced walls, which would eliminate the need for a nozzle 8. These reinforcement walls would act in a similar fashion to the nozzle 8 by focusing the output energy in the direction of the burst disc 17.

With reference to FIG. 1, the nozzle 8 is attached to the end cap 4 by crimping, but other methods of attachment are suitable such as press fit or welding. The nozzle is preferably made from standard carbon steel and has an opening 9 that is less than the size of the discharge opening 14, with a preferred range of 2 mm to 8 mm.

Upon the detection of a crash or a sudden deceleration, the burst disk 17 is ruptured by the opening device 1. As discussed above, the ignition material is ignited by a bridgewire. The explosion of the ignition material generates a shockwave that breaks apart the burst disk 17. In order for the burst disk 17 to rupture, the opening device 1 is disposed less than 8.0 mm away from a center of the fully domed burst disk. Once the burst disk 17 is opened, stored gas from the pressure vessel 10 escapes through the outlet vents 22 in a radial direction. The cold gas inflator has a fragment screen 20a to capture fragments from the ruptured burst disk so that these fragments will not wind up in the airbag.

Figure 2:
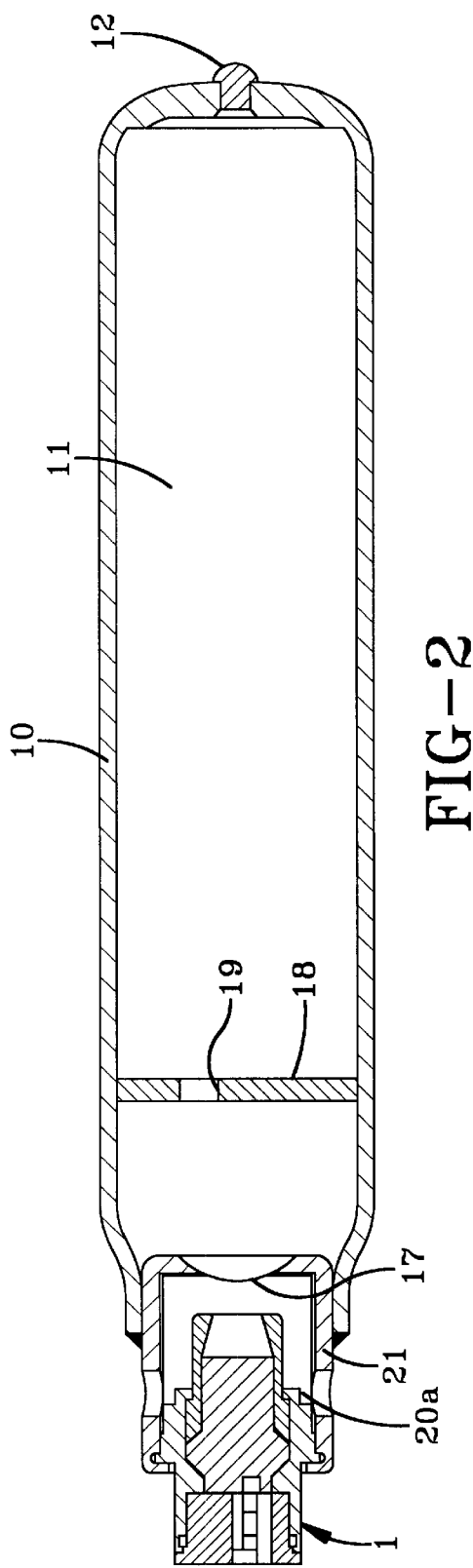
FIG. 2 is similar to FIG. 1 except that the orifice plate is located further downstream in the pressure vessel.

There are several methods of controlling the gas flow rate. One method of controlling the gas flow rate is to increase/decrease the diameter of the outlet vents 22. Another method is to increase/decrease the diameter of the discharge opening 14. Lastly, a regulating orifice plate 18 can be installed in the pressure vessel to control the rate of gas discharge. In the preferred embodiment as shown in FIG. 1, the orifice plate 18 is mounted flush against the diffuser 21. The stored gas 11 flows through the orifice 19 of the orifice plate 18. FIG. 2 shows an alternate embodiment where the orifice plate 18 is installed further downstream. The presence of a downstream orifice plate 18 affects the flow rate of the stored gas 11 through the discharge opening 14 since the discharge opening 14 has a greater area than the orifice 19. A first quantity of stored gas 11, which is the stored gas 11 between the discharge opening 14 and the orifice plate 18, flows through the discharge opening 14. On the other hand, a second quantity of stored gas 11, which is stored gas 11 between the orifice plate 18 and the first end 6, must flow through both the orifice 19 and the discharge opening 14. It is preferred that the orifice plate 18 be disposed in a position closer to the second end 7 of the pressure vessel than the first end 6 thus limiting the amount of unthrottled gas to an energy level sufficient to complete the rupturing of the burst disc. By doing so the initial onset of the pressure time curve may be reduced thus aiding the inflator in meeting out of position requirements during occupant level testing.

An axial flow cold gas inflator is shown in FIG. 3. Unlike the radial flow cold gas inflator, the axial flow cold gas inflator has an opening device mounted at an angle C. As shown in FIG. 3, angle C is the acute angle formed by the interception of the longitudinal axis B of the opening device and the longitudinal axis A of the pressure vessel 10. The opening device could be mounted at any angle C, but the preferred angle C is greater than 10°.

By mounting the opening device at an angle, a large flow area is allowed for the escaping gas in the axial direction which allows for superior packaging schemes over conventional radial flow concepts which convert the gas to axial flow via an external manifold (not shown). It is preferred that the opening device 1 is recessed within the axial flow coupler 31 so that no portion of the opening device 1 extends beyond the cross-section of the pressure vessel 10.

The axial flow cold gas inflator has an opening device that is similar to the opening device for FIG. 1, which was discussed above. The stored gas 11 escapes through the axial flow intermediate member 30 and through the axial flow coupler 31. The stored gas then passes through the optional fragment screen 20b at the end of the axial flow coupler. The axial flow coupler directs the gas to flow in an axial direction as it exits the cold gas inflator. In order to adhere to Department of Transportation regulations, the axial flow cold gas inflator can have a flow diverter 32 attached to the end of the axial flow coupler 31 as shown in FIG. 4. The flow diverter 32 changes the gas flow of the cold gas inflator from axial flow to radial flow.

Figure 5:
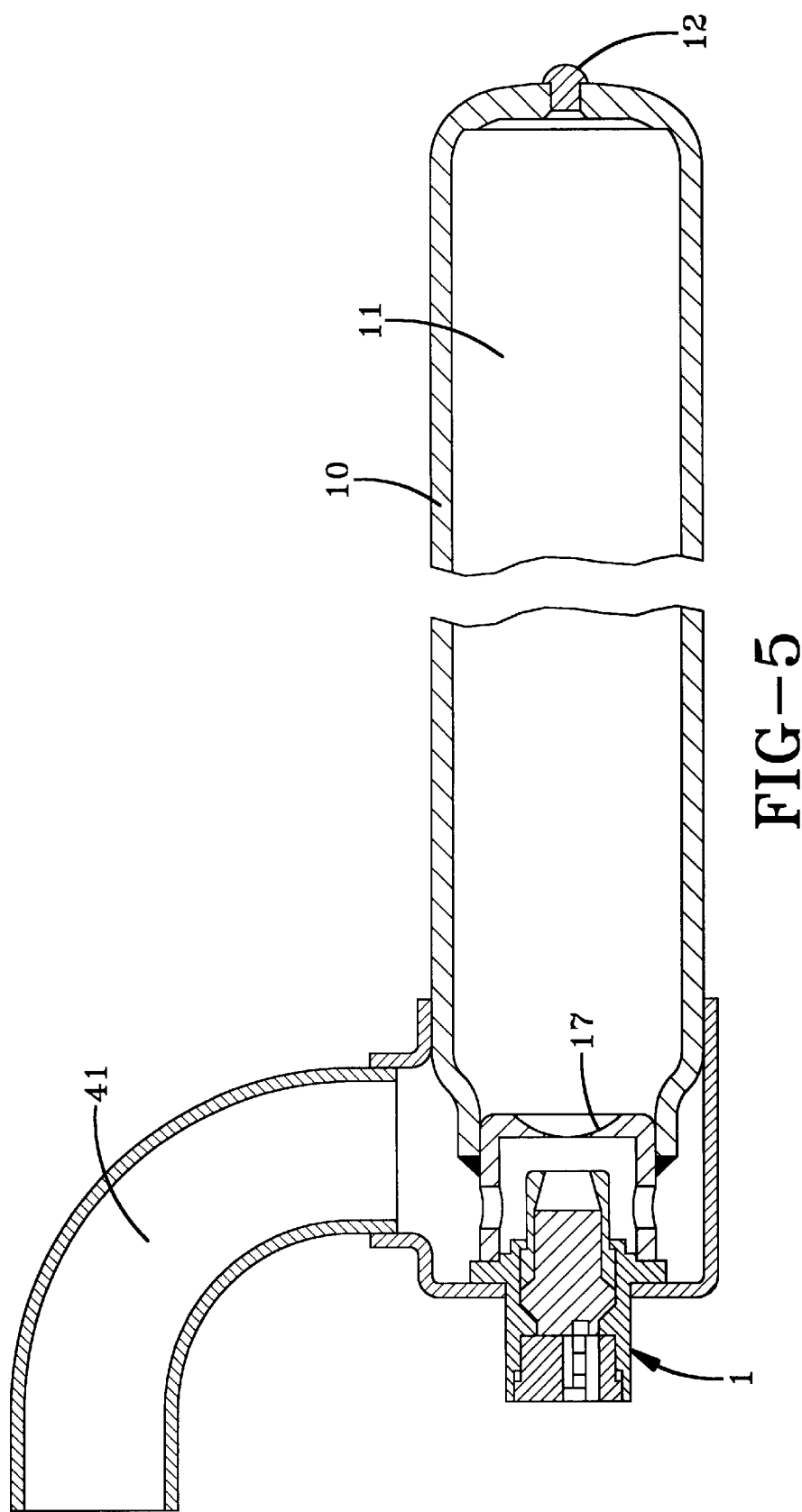
FIG. 5 is a partial cross sectional schematic diagram of a second embodiment of a cold gas inflator with an axial flow diffuser.

An alternative embodiment for the axial flow inflator is presented in FIG. 5. The cold gas inflator is of radial design and has an axial flow elbow 41 externally attached to the inflator to convert the gas flow from radial to axial. The stored gas 11 travels from the pressure vessel 10 to the axial flow elbow 41 and into an airbag cushion (not shown). The direction of the flowing, gas from the axial flow elbow 41 is parallel to the longitudinal axis A of the pressure vessel 10; however, the gas exiting the cold gas inflator does not overlap the longitudinal axis A of the pressure vessel 10.

Many changes and modifications in the above-described embodiment of the invention can, of course, be carried out without departing from the scope thereof. Accordingly, that scope is intended to be limited only by the scope of the appended claims.

We claim:

1. A cold gas inflator comprising:

a pressure vessel having a second end with a discharge opening, the discharge opening closed by a burst disk, the burst disk being remote from a first end of the pressure vessel;

an orifice plate mounted flush against a diffuser wherein the diffuser defines the discharge opening, the orifice plate has an orifice therethrough whereby the orifice has a smaller diameter than the discharge opening, the orifice of the orifice plate has a diameter less than half the diameter for the pressure vessel; and an opening device for rupturing the burst disk.

2. The cold gas inflator according to claim 1, further comprising a fragment screen for capturing fragments of the burst disk when the burst disk is ruptured.

3. The cold gas inflator according to claim 1, wherein the center of the burst disk is less than 8.0 mm away from the opening device.

4. The cold gas inflator according to claim 1, wherein the opening device comprises an igniter and a nozzle for focusing an output energy of the igniter.

5. The cold gas inflator according to claim 4, wherein the nozzle has an opening that is less than the size of the discharge opening with a range of 2 mm to 8 mm.

6. The cold gas inflator according to claim 1 wherein, the orifice plate controls gas flow rate, the orifice plate is disposed in closer proximity to the second end of the pressure vessel than to the first end of the pressure vessel.

7. The cold gas inflator according to claim 1, wherein the opening device is positioned so that a longitudinal axis of the opening device is essentially parallel with a longitudinal axis of the pressure vessel.

8. The cold gas inflator according to claim 1 wherein the diffuser supports the burst disk and has an outlet vent, the outlet vent is arranged on the diffuser so that a gas from the pressure vessel exits the inflator in a radial direction.

9. The cold gas inflator according to claim 8 wherein the diffuser has bendable legs for reducing fill time for the pressure vessel, the burst disk is connected to the bendable legs.

* * * * *